May 9, 1944.  C. A. FRAMBURG, JR., ET AL  2,348,462
ELECTRICAL RESISTANCE DEVICE
Filed July 16, 1942
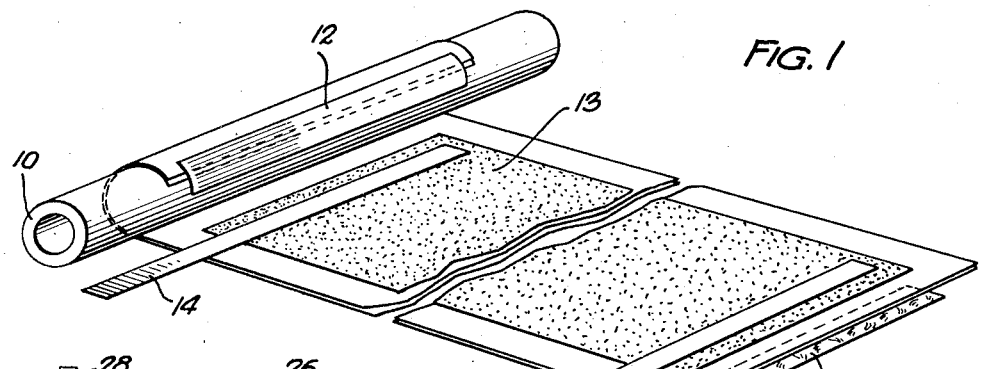
FIG. 1
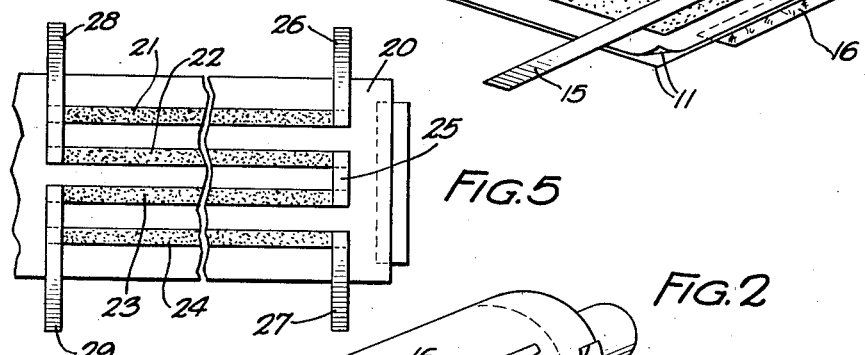
FIG. 5
FIG. 2
FIG. 4
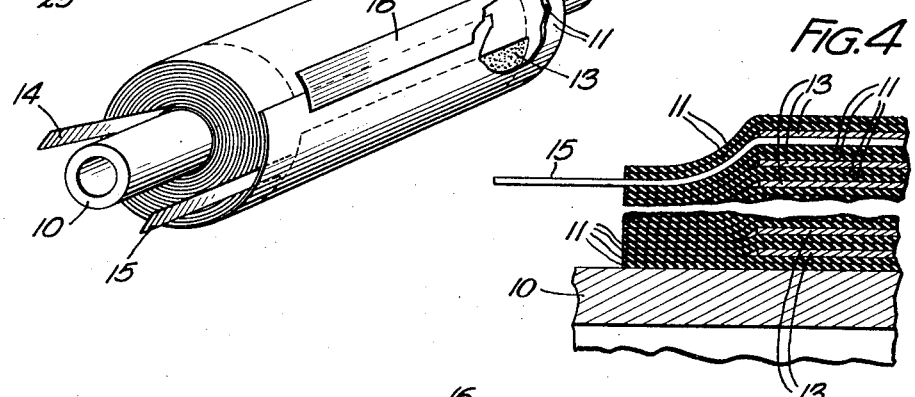
FIG. 3
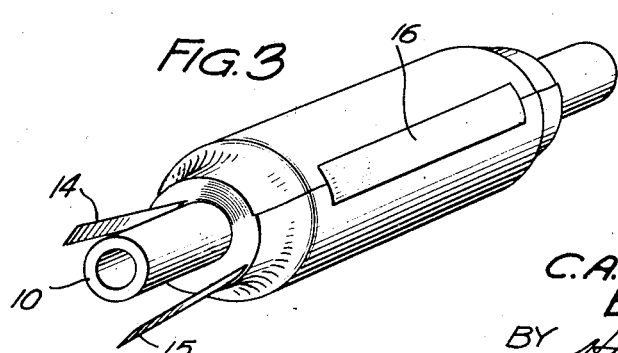
INVENTORS
C. A. FRAMBURG JR
E. W. LARSON
BY Harry L. Duft
ATTORNEY Patented May 9, 1944

2,348,462

UNITED STATES PATENT OFFICE 2,348,462

ELECTRICAL RESISTANCE DEVICE

Charles A. Framburg, Jr., Forest Park, and Elbert W. Larson, Downers Grove, Ill., assignors to Western Electric Company, Incorporated, New York, N. Y., a corporation of New York Application July 16, 1942, Serial No. 451,154

16 Claims. (Cl. 201—75)

This invention relates to electrical resistance devices and a method of making such devices and more particularly to a wound electrical resistance device and a method of manufacturing it.

It is an object of the present invention to provide a simple, inexpensive and stable electrical resistance device and a method for expeditiously and economically making such devices.

In accordance with one embodiment of such an invention, a resistance device is formed by applying two layers of a polystyrene film to a mandrel and, after winding several layers of the polystyrene film on the mandrel, a web of carbon or graphite coated or impregnated material, such as paper, may be interposed between the layers of film and a terminal element may be placed upon the carbon or graphite impregnated material. Continued rotation of the arbor will wrap the layers of material about the arbor in a construction similar to that in wound condensers and the layers of film will insulate the carbon or graphite impregnated material from adjoining layers of said material. After a predetermined number of layers of graphite impregnated material have been wound on the arbor to provide the desired electrical resistance characteristics, a second terminal may be placed on the coated material and several more wrappings of film may be made to complete the coil. After the coil has thus been wound, a layer of scotch tape may be used to hold the wrappings in place. The rolled resistance unit may then be subjected to a vacuum for a predetermined time at a relatively low temperature to remove moisture from the assembly and then without releasing the vacuum, the temperature may be raised to a point which will release the strains in the polystyrene film and cause it to shrink uniformly and thereby effectively close the ends of the rolled assembly against the entrance of moisture. The resistance unit thus formed may be used in this condition or, if desired, may be potted and covered with a moisture resistant compound if so desired.

In another embodiment of the invention a plurality of narrow strips of carbon impregnated paper may be wound between layers of polystyrene film which are wide enough to cover the strips when the strips are spaced apart and interconnected by conducting connector members to provide a resistor having a large amount of resistance.

A better understanding of the invention will be had by reference to the accompanying drawing, wherein Fig. 1 is a view in perspective of a mandrel having two layers of polystyrene film attached thereto by means of a strip of scotch tape and showing the relative position of the layers of polystyrene film and graphite or coated carbon material, together with the position of the terminals whereby the electrical connections may be made to the carbon or graphite coated material;

Fig. 2 is a view in perspective of the resistance unit after it has been rolled on the mandrel, after it has the terminals assembled with it and prior to heating it at a relatively high temperature;

Fig. 3 is a perspective view of the completed resistance unit after it has been subjected to a temperature such that the strains in the polystyrene film will be released.

Fig. 4 is a fragmentary sectional view taken through the end portion of the wrappings of film and coated or impregnated material, as shown in Fig. 3, and Fig. 5 is a fragmentary developed view of an alternate arrangement of impregnated paper strips and terminals.

Referring to the drawing, wherein like reference numerals designate the same parts throughout the several views, a mandrel 10, in the form of a copper tube, may be placed in any suitable winding apparatus, for example, a condenser winding machine, and after the mandrel has been placed in the machine, two layers of polystyrene film 11—11 may be attached to the mandrel by means of a piece of scotch tape 12 and the mandrel rotated several turns to apply insulating layers of polystyrene film on the mandrel. After the layers of film have been thus wound on the mandrel, a layer of graphite or carbon coated or impregnated material, for example, a graphite impregnated paper 13, may be inserted between the layers of film 11 wrapped on the arbor 10 and a terminal in the form of a metallic connector member 14, may then be placed upon the layer of graphite impregnated paper. After the impregnated paper 13 and the terminal 14 have been placed in the approximate position shown in Fig. 1, the mandrel 10 may be rotated clockwise to wrap a number of layers of graphite impregnated paper into a unit, as shown in Fig. 2.

When sufficient graphite impregnated paper has been wound into the unit, to provide the desired resistance characteristics, a second terminal 15 may be placed on the graphite impregnated paper and the mandrel rotated a sufficient distance to provide overlapping edges of polystyrene film 11—11 extending beyond the end of the impregnated paper 13 to insulate the end of the resistance material from contact with outside metallic parts and thereupon another layer of scotch tape 16 may be used to hold the layers of polystyrene film in the position as shown in Fig. 2.

After a number of wrappings of graphite or carbon impregnated paper have been wound in the manner just described, and insulated one from another by the layers of polystyrene film with the terminals 14 and 15 extending beyond the edges of the polystyrene film to provide connecting elements, the assemblage may be subjected to a temperature of approximately 120° F. for approximately 20 hours while a vacuum of approximately four millimeters of mercury is applied thereto in order to remove any trace of moisture from between the wrapped layers of graphite impregnated paper and polystyrene film. After the assembly has thus been dried, the temperature may be raised slowly to approximately 195° F. and to not more than 205° F.

The polystyrene film utilized herein is the usual commercial product which is sold in a condition where it is stretched 100% and when the temperature of this film is raised to approximately 195° F., the strains in the polystyrene film will be released and shrinkage will ensue, whereby the polystyrene film will tend to return to its unstretched condition. In so doing, the layers of resistance material comprising a graphite impregnated web of paper 13 will be appreciably compressed and the ends of the polystyrene film, which, as may be seen in the various figures of the drawing, extend an appreciable distance beyond the edges of the graphite impregnated paper 13, will shrink down onto the mandrel 10 and assume substantially the position shown in Fig. 3, thereby to effectively seal the ends of the convolutions of film against the mandrel and against each other. This will prevent the entrance of any moisture between the convolutions of the wound resistance element and provide an effective seal.

In addition to effectively sealing the ends of the resistance unit against the penetration of moisture, the compressing effect of the polystyrene film, in shrinking back to its unstretched condition, will place the graphite in the graphite impregnated paper under a definite pressure which will be maintained due to the stability of the polystyrene film under varying atmospheric conditions of temperature and humidity and the resistance unit thus formed will maintain its resistance characteristics under the temperature and humidity to which it would normally be subjected.

If desired, the resistance unit thus formed may be mounted by means of the mandrel 10 or may be potted in a manner similar to that in which condensers are potted, using any suitable potting compound and whether used in the state shown in Fig. 3, or potted, the resistance unit will maintain its resistance characteristics under varying temperature and moisture conditions to which such a piece of apparatus may be subjected.

While the material described hereinbefore has been referred to a polystyrene film, it will be understood that any of the plastic films, such as long, linear straight chain polymers and copolymers or other long chain compounds such as polyamides or polyesters, the molecules of which can be oriented by mechanical working and the molecules of which, under subsequent heating, will resume their random position within the film, may be used. Furthermore, while the description hereinbefore has been of the construction of resistance elements as shown in Figs. 1, 2, 3 and 4, an alternate arrangement of the parts making up the resistance device may be made, as shown in Fig. 5. In this figure, layers of plastic film 20 may be assembled with strips 21, 22, 23 and 24 of carbon or graphite impregnated paper positioned as shown in Fig. 5 and with a metallic connector 25 interconnecting the right ends of the strips 22 and 23 and with terminals 26 and 27 engaging the right ends of the strips 21 and 24. In addition to these connectors and terminals, a pair of terminals 28 and 29 may be provided for interconnecting the left ends of the strips 21 and 22 and the left ends of the strips 23 and 24, respectively. With this arrangement of strips of carbon or graphite impregnated material and terminals and connectors insulated by layers of plastic film and wound on a mandrel, the single resistance unit of relatively small size may be connected in various electrical circuits to provide four different resistance values; for example, if the terminals 27 and 29 are used to connect the resistance device in a circuit only, the strip 24 of carbon impregnated material will be connected in the circuit. If the terminals 28 and 29 are connected in a circuit, the resistance provided will include only the strips of carbon or graphite impregnated paper 22 and 23. If the terminals 27 and 28 are connected in the circuit, the resistance in the circuit will be the sum of the resistance of the three carbon or graphite impregnated strips 22, 23 and 24, whereas if the terminals 26 and 27 are connected in the circuit, all of the strips 21, 22, 23 and 24 of impregnated material will be connected in the circuit.

It has been found that when carbon or graphite impregnated paper is wound into a resistance unit in the manner described hereinbefore and sealed between layers of plastic film which have been shrunk by releasing the strains set up in them in mechanically working them, it will result in the temperature coefficient of such resistance units being considerably improved in comparison with units wound without shrinking of the plastic film, apparently because of the pressure applied to the layers of impregnated material by the plastic film.

What is claimed is:

1. An electrical resistance device comprising a continuous web of material impregnated with a conducting material to form a resistance element, a continuous web of insulating material wider and longer than the resistance element to enclose the edges and ends of the resistance element, and terminals engaging the resistance element and extending beyond the edges of the insulating material.

2. An electrical resistance device comprising a continuous web of material impregnated with a conducting material to form a resistance element, a continuous web of insulating material wider and longer than the resistance element, said web of insulating material comprising a film of plastic material which has been shrunk by re-orientation of its molecules to enclose the edges and ends of the resistance element, and terminals engaging the resistance element and extending beyond the edges of the insulating material.

3. The method of forming electrical resistance devices which comprises simultaneously winding a web of graphite impregnated material and a web of a plastic film, the molecules of which have been oriented by mechanical working on a mandrel, and then releasing the strains generated in the film by the working thereof to cause the film to shrink and seal the impregnated material from outside atmosphere solely by said shrinking.

4. The method of forming an electrical resistance device which comprises interposing a layer of graphite impregnated paper between layers of polystyrene film, wrapping the film and impregnated material on a mandrel with the film overlapping the ends and edges of the impregnated material, heating the assembly to release the strains in the polystyrene film and shrink it to completely surround the impregnated material by shrinking the overlapping edges of the film into intimate contact one with the other.

5. The method of forming electrical resistance devices which comprises winding a relatively narrow strip of graphite impregnated paper and a web of polystyrene film longer and wider than the strip of paper on a mandrel, treating the assembled strips and web to remove moisture from them and slowly raising the temperature of the assembly to form 195° F. to not more than 205° F. to cause the polystyrene film to shrink and seal its edges one to another solely by said shrinkage.

6. An electrical resistance unit comprising a web of graphite impregnated material and a web of an initially set pre-stretched insulating material wound in superposed layers and said initially set pre-stretched material being shrunken from its pre-stretched condition after being assembled with the graphite impregnated material.

7. An electrical resistance unit comprising webs of graphite impregnated material and pre-stretched insulating material wound in superposed layers, said web of insulating material being wider and longer than the graphite impregnated material and being shrunken from its pre-stretched condition to completely enclose the graphite impregnated material.

8. In an electrical resistance device, a web of graphite impregnated material interposed between layers of a web of insulating material wound in a stretched condition with the impregnated material and shrunken to seal the edges of the layers of conducting material within the insulating material.

9. In an electrical resistance device, a web of carbon impregnated paper interposed between layers of a web of plastic film, the molecules of which have been oriented by working and caused to resume their random position under subsequent heating to shrink the overlapping edges of the film into intimate contact with adjacent layers of film and seal the edges of the layers of film to each other to enclose the impregnated material from the surrounding atmosphere.

10. A method of forming an electrical resistance device which comprises wrapping a layer of a web of plastic material which has been pre-stretched by disturbing the normal orientation of its molecules upon a mandrel, applying a web of graphite impregnated material to the layer of film on the mandrel, wrapping the film and impregnated material about the mandrel to wind superposed layers of film and impregnated material in a wrapped condition about the mandrel, inserting a terminal element against the surface of the impregnated material with its end extending beyond the edge of the film, said film being wrapped with its edges extending beyond the edges of the impregnated material, applying a terminal to the impregnated material adjacent the outer end thereof, overlapping the outer end of the impregnated material with an extension of the layer of film, attaching the end of the film to the adjacent layer thereof, and then treating the assembly to cause the molecules in the film to resume their normal orientation, thereby to shrink the edges of the film into intimate engagement with each other for sealing the impregnated material from contact with outside atmosphere.

11. A method of forming an electrical resistance device which comprises wrapping upon a mandrel a layer of a web of plastic material which has been pre-stretched by disturbing the normal orientation of its molecules, applying a web of graphite impregnated material to the layer of film on the mandrel, wrapping the film and impregnated material about the mandrel to wind superposed layers of film and impregnated material in a wrapped condition about the mandrel, inserting a terminal element against the surface of the impregnated material with its end extending beyond the edge of the film, said film being wrapped with its edges extending beyond the edges of the impregnated material, applying a terminal to the impregnated material adjacent the outer end thereof, overlapping the outer end of the impregnated material with an extension of the layer of film, attaching the end of the film to the adjacent layer thereof, subjecting the assembly thus formed to a temperature which will cause the molecules in the film to attempt to resume their normal orientation, thereby to shrink the edges of the film into intimate contact one with another and to compress the layers of impregnated material between the layers of film.

12. A method of forming an electrical resistance device which comprises wrapping upon a mandrel, a layer of a web of plastic material which has been pre-stretched by disturbing the normal orientation of its molecules, applying a web of graphite impregnated material to the layer of film on the mandrel, wrapping the film and impregnated material about the mandrel to wind superposed layers of film and impregnated material in a wrapped condition about the mandrel, inserting a terminal element against the surface of the impregnated material with its end extending beyond the edge of the film, said film being wrapped with its edges extending beyond the edges of the impregnated material, applying a terminal to the impregnated material adjacent the outer end thereof, overlapping the outer end of the impregnated material with an extension of the layer of film, attaching the end of the film to the adjacent layer thereof, and sealing the impregnated material from contact by surrounding atmosphere by treating the film to cause its molecules to attempt to resume their normal orientation.

13. A resistance unit comprising alternate layers of graphite impregnated paper, a polystyrene film wrapped on a mandrel with the polystyrene film in a shrunken condition after having been wound in a stretched condition and with the edges of the polystyrene film extending beyond the edges of the impregnated paper so that on shrinking the polystyrene film has sealed the impregnated paper from contact by the surrounding atmosphere.

14. A resistance unit comprising alternate layers of graphite impregnated paper and a polystyrene film wrapped on a mandrel with the polystyrene film in a shrunken condition after having been wound in a stretched condition and with the edges of the polystyrene film extending beyond the edges of the impregnated paper so that on shrinking the polystyrene film has sealed the impregnated paper from contact by the surrounding atmosphere, and a plurality of terminals engaged with the impregnated paper and frictionally held in engagement therewith by the shrunken layer of film.

15. An electrical resistance device comprising a continuous web of a carbon impregnated material, a continuous web of an initially set pre-stretched insulating material wider and longer than the web of carbon impregnated material, said webs being wound with the initially set pre-stretched material in its stretched condition and the strains in the pre-stretched material being then released to shrink said material and surround entirely the impregnated material, and terminals extending through the shrunken initially set pre-stretched material into contact with the carbon impregnated material.

16. An electrical resistance device comprising wound superposed webs of insulating material and carbon impregnated material, said web of insulating material being wider and longer than the web of carbon impregnated material to extend beyond the ends and edges of the carbon impregnated material and being shrunk to seal the edges of the carbon impregnated material from the surrounding atmosphere solely by the shrinkage of the insulating material.

CHARLES A. FRAMBURG, Jr.
ELBERT W. LARSON.